United States Patent [19]

Nogami et al.

[11] Patent Number: 4,553,840
[45] Date of Patent: Nov. 19, 1985

[54] DOUBLE MONOCHROMETER

[75] Inventors: Taro Nogami, Katsuta; Masamichi Tsukada, Ibaraki, both of Japan

[73] Assignee: Hitachi, Ltd., Tokyo, Japan

[21] Appl. No.: 442,113

[22] Filed: Nov. 16, 1982

[30] Foreign Application Priority Data

Nov. 20, 1981 [JP] Japan .............................. 56-185307

[51] Int. Cl.[4] .............................................. G01J 3/18
[52] U.S. Cl. ..................................... 356/333; 356/318
[58] Field of Search ............... 356/301, 318, 332, 333, 356/334

[56] References Cited

U.S. PATENT DOCUMENTS

| | | | |
|---|---|---|---|
| 3,098,408 | 7/1963 | Cary | 356/333 |
| 3,664,742 | 5/1972 | Witte et al. | 356/332 |
| 4,068,954 | 1/1978 | Da Silva | 356/334 |
| 4,326,802 | 4/1982 | Smith, Jr. et al. | 356/333 |

FOREIGN PATENT DOCUMENTS 2096792 10/1982 United Kingdom ............... 356/334

*Primary Examiner*—F. L. Evans
*Attorney, Agent, or Firm*—Antonelli, Terry & Wands

[57] ABSTRACT

A double monochrometer comprises a main monochrometer including a plane grating and an auxiliary monochrometer including a concave grating. The concave grating is disposed on the entrance or exit optical axis of the main monochrometer. Preferably, the angular dispersion of the concave grating is selected to be smaller than that of the plane grating. Sine bars for rotating the concave and plane gratings for wavelength scanning can be driven by means of a single feed screw mechanism even if the lengths of the sine bars are made different from each other in accordance with a difference in angular dispersion between the concave and plane gratings.

15 Claims, 9 Drawing Figures $\lambda - \lambda_M$ $\lambda - \lambda_M$ $\lambda - \lambda_M$ $\lambda - \lambda_M$

DOUBLE MONOCHROMETER

BACKGROUND OF THE INVENTION

The present invention relates to a double monochrometer in which a pair of monochrometers are series-connected for eliminating stray light.

One example of the conventional double monochrometers is shown in FIG. 1. Referring to FIG. 1, light entering a first slit 1 impinges on a spherical mirror 8 from which a substantially collimated light flux is directed to a plane grating 4. Light diffracted at the grating 4 is focused by a spherical mirror 9 and passes through a plane mirror 6 to a second slit 2. Light from the slit 2 passes through a plane mirror 7, a spherical mirror 10, a plane grating 5 and a spherical mirror 11 and emerges from a third slit 3. Since the dispersion of light takes place twice in two series-connected monochrometers including the gratings 4 and 5 respectively, that is, a monochromatic light at a certain wavelength emerging from the first monochrometer but containing stray light is again extracted from the second monochrometer as a monochromatic light of that wavelength, the stray light can be effectively eliminated. However, the double monochrometer shown in FIG. 1 has two drawbacks that many mirrors are used resulting in a very large total loss of light associated with reflection and that the degree of freedom for selection of the grating constants or angular dispersions of the plane gratings 4 and 5 is small. More especially, in order to minimize the total loss of light at slits included, the two monochrometers must be arranged in a reverse or subtractive dispersion relation with each other and moreover a considerable difference must be given between the degrees of dispersion (or angular dispersions) of the respective monochrometers, which requires different lengths of respective sine bars for driving the plane gratings 4 and 5. It is difficult to move such sine bars by means of a single feed screw mechanism in the optical system shown in FIG. 1.

Another conventional double monochrometer is shown in FIG. 2. A prism 12 is used as the first dispersion element in place of the plane grating 4 shown in FIG. 1. Since no components corresponding to the plane mirrors 6 and 7 of FIG. 1 are required, the number of reflecting planes used therein is reduced as compared with the optical system of FIG. 1. But, this double monochrometer has more or less drawbacks similar to those mentioned in conjunction with FIG. 1. Moreover, the use of the prism involves inherent drawbacks that the dispersion by a prism depends upon wavelengths or is smaller at longer wavelengths and that hence a sine bar cannot be used for driving the prism.

In still another example, the plane gratings 4 and 5 in FIG. 1 are replaced by prisms, respectively. This example involves the problem of reflection loss as mentioned in conjunction with FIG. 1 and the problem associated with the use of prism as mentioned in conjunction with FIG. 2.

SUMMARY OF THE INVENTION

An object of the present invention is to provide a double monochrometer in which the loss of light is small.

Another object of the present invention is to provide a double monochrometer having an optical arrangement in which the loss of light is small and a grating driving mechanism can be attained with a simple construction.

Generally speaking, a double monochrometer according to the present invention comprises two monochrometers one of which uses a plane grating and the other of which uses a concave grating. Though the resolution power of the concave grating is inferior to the plane grating, a resolution power required for the double monochrometer can be attained by the plane grating. By using the concave grating, the loss of light associated with reflection can be reduced. Even if the concave grating is used, a sufficient effect of eliminating stray light can be maintained in the double monochrometer.

The concave grating can be disposed on the entrance or exit optical axis of the monochrometer using the plane grating. In order to reduce the loss of light at slits, it is preferable that the degree of dispersion of the concave grating is selected to be smaller than that of the plane grating. In that case, the both monochrometers can be arranged in either additive or reverse dispersion relation. The reverse dispersion arrangement provides the smallest light loss.

Since the concave grating can be arranged on the entrance or exit optical axis of the plane grating monochrometer, it is possible to drive both the sine bars of the concave and plane gratings by use of a single feed screw means even if the degree of dispersion of the concave grating is selected to be smaller than that of the plane grating. Only a requirement is to select the length of the sine bar for the concave grating in accordance with the smaller degree of dispersion thereof. Though the above can be realized in either additive or reverse dispersion arrangement, the grating driving mechanism is more simple in the case of the latter arrangement.

One of preferred applications of the double monochrometer according to the present invention includes the use thereof at the fluorescence exciting side of a fluorescence spectrophotometer. The spectrophotometer can enjoy a good sensitivity since the inventive double monochrometer involves a smaller loss of light. If the inventive double monochrometer is constructed so that the directions of dispersion in the both gratings are all vertical while the elongated apertures of the slits extend horizontally, a sample cell can be illuminated with a horizontally elongated light flux, which eliminates a need of a large amount of sample in the cell. In addition thereto, if an optical system of the fluorescence spectrophotometer disposed behind the sample cell is arranged such that it primarily takes in light in a horizontal direction, fluorescence produced from the excited sample can be effectively taken in the optical system, which contributes to a further improvement on the sensitivity of the spectrophotometer.

DESCRIPTION OF THE PREFERRED EMBODIMENTS

Figure 1:
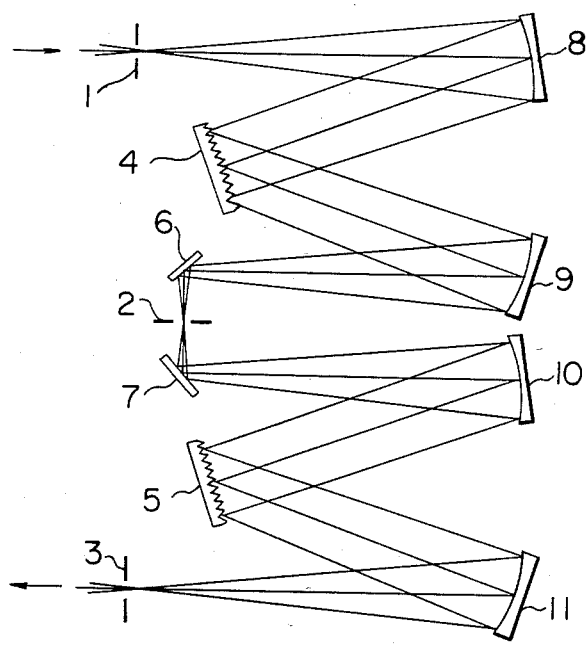
FIG. 1 shows the optical system arrangement of one of the conventional double monochrometers.
Figure 2:
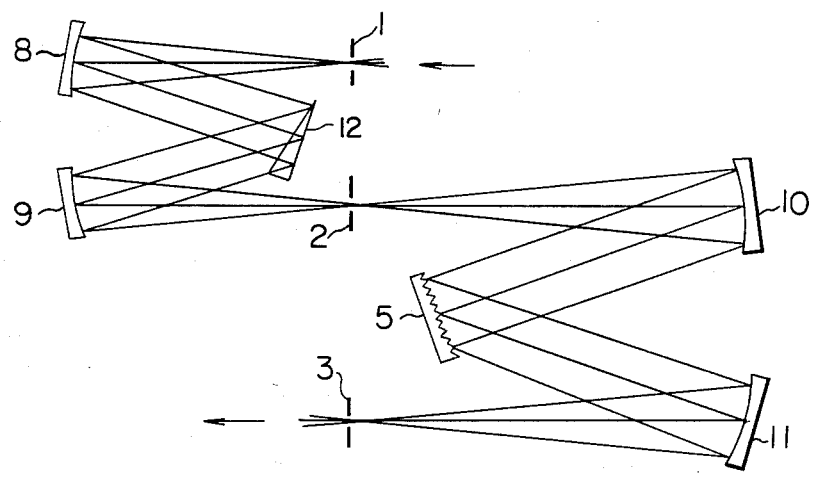
FIG. 2 shows the optical system arrangement of another conventional double monochrometer.
Figure 3:
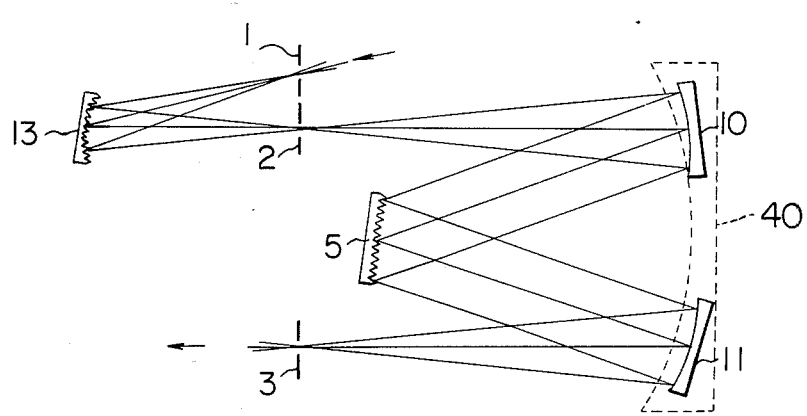
FIG. 3 shows the optical system arrangement of a double monochrometer according to an embodiment of the invention.

The arrangement of the optical system of a double monochrometer according to an embodiment of the present invention is shown in FIG. 3. In the figure, the same components as those in FIGS. 1 and 2 are designated with equivalent reference numerals. Referring to FIG. 3, incident light from a first or entrance slit 1 is dispersed at and also focused by a concave grating 13. Preferably, the concave grating 13 may be a large-aperture and astigmatism-corrected grating. The focused monochromatic light passes through a second or intermediate slit 2 and then collimated by a spherical or collimator mirror 10. The collimated light is again dispersed at a plane grating 5 and the dispersed light is focused by a spherical or camera mirror 11 and emerges from a third or exit slit 3.

By using the concave grating 13, the number of reflecting mirrors and the loss of light associated with reflection are reduced as compared with the conventional systems. Why the number of reflecting mirrors required is small is because the concave grating has a focusing function by itself without requiring any spherical mirror and because with no mirror arrangement for folding the optical axis the concave grating can be disposed on the entrance optical axis of the plane grating monochrometer. Even if in the system shown in FIG. 1 one tries to forcibly dispose the exit optical axis of the first monochrometer on the entrance optical axis of the second monochrometer, thereby eliminating the mirrors 6 and 7, there will take place an inconvenience that the directions of curvature of the slits, which curvature is usually provided for correcting aberration, are not registered with each other.

In the present embodiment, the concave grating 13 has 600 grooves per mm while the plane grating 5 has 1200 grooves per mm. Therefore, the degree of dispersion (or angular dispersion) of the first or auxiliary monochrometer including the first slit 1 serving as an entrance slit, the concave grating 13 and the second slit 2 serving as an exit slit is much smaller than that of the second or main monochrometer including the second slit 2 serving as an entrance slit, the spherical mirror 10, the plane grating 5, the spherical mirror 11 and the third slit 3 serving as an exit slit. As a result, the overall resolution power of this double monochrometer is determined by the second monochrometer.

Though the mounting for the main monochrometer shown in FIG. 3 is of Czerney-Turner type in which the individual mirrors 10 and 11 are used, an Ebert type mounting can be employed by using a single integral mirror 40 (shown by dashed lines) in place of the individual mirrors 10 and 11. Further, though in the shown embodiment the concave grating is disposed on that portion of the entrance optical axis of the main or plane grating monochrometer in front of the entrance slit 2 thereof, the concave grating can be equally disposed on that portion of the exit optical axis of the main monochrometer behind the exit slit 3. A construction in that case is a vertically reversed version of FIG. 3 in which the slits 3 and 1 serve as entrance and exit slits of the resulting double monochrometer, respectively.

Generally, monochrometers including concave gratings are poor in resolution power. Namely, defocusing is exhibited except special wavelengths. However, this drawback provides no problem when the concave grating monochrometer is used in series connection with a plane grating monochrometer to form a double monochrometer free of stray light, as is done in the present invention.

As will be later explained referring to FIGS. 4 and 5, a reverse dispersion arrangement of two monochrometers is preferable in order to suppress the loss of light in slit portions. To minimize the loss, it is further required that one of the two monochrometers has the degree of dispersion smaller than the other monochrometer. The latter means that the lengths of sine bars for gratings of the respective monochrometers are different. To satisfy both this requirement and the former requirement while allowing the use of a single feed screw for driving such sine bars with different lengths is difficult in the conventional optical system arrangement shown in FIG. 1. In the inventive optical system in which the concave grating of the auxiliary monochrometer can be disposed on the entrance or exit optical axis of the main monochrometer, the above intended approach can be easily achieved by means of a driving mechanism which will be later explained referring to FIG. 6.

Now referring to FIGS. 4a, 4b, 5a and 5b, description will be made of how the amount of light passing through slit portions of a double monochrometer differs depending upon the directions of dispersion by two monochrometers as well as the degrees of dispersion in the two monochrometers. In each of these figures, the abscissa represents a distance S from the slit center in the width direction of each slit while the ordinate represents a difference $(\lambda = \lambda_M)$ of the slit permeable wavelength $\lambda$ from a center wavelength $\lambda_M$. It is assumed that the physical aperture widths of the second and third slits are the same or W and the first slit has its width larger than W. A pair of broken lines indicated by $S_2$ show the range of wavelengths which exist at any position distanced from the slit center in a plane of the second slit. Similarly, solid lines indicated by $S_3$ show such a wavelength range in a plane of the third slit. A hatched area corresponds to light which are ultimately taken out through the third slit.

Figure 4A:
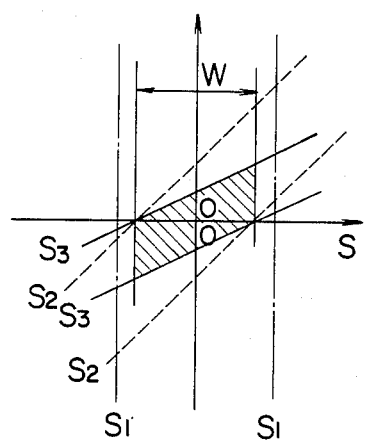
FIGS. 4a, 4b, 5a and 5b are views for clarifying effects of the present invention while explaining the loss of light at slits in relation with the additive and reverse dispersion arrangements when the degrees of dispersion in two monochrometers used in a double monochrometer are identical and when they are different.
Figure 4B:
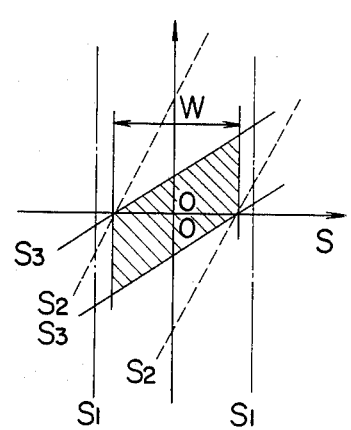

FIG. 4 shows the case where two monochrometers are arranged in an additive dispersion relation, that is, the directions of dispersion in the respective monochrometers are established in such a manner that the dispersions in the two monochrometers are added or expanded to each other. Though the additive dispersion arrangement is often advantageous in increasing resolution power, the loss of light is large, as is apparent from that the size of the hatched area is small as compared with FIG. 5. FIG. 4a is an example in which the linear dispersion (mm/Å) of the first monochromer is selected to be equal to that of the second monochrometer. The example of FIG. 4a, which may be easily realized in the conventional optical system arrangement of FIG. 1 if a grating driving mechanism is designed considering the rotation directions of the plane gratings 4 and 5, will involve the largest loss of light. FIG. 4b is an example in which the linear dispersion of the first monochrometer is selected to be smaller than (in the shown case, about a half of) that of the second monochrometer. Though the example of FIG. 4b may be realized in the conventional optical system arrangement of FIG. 1 with a complicated grating driving mechanism, it can be realized in the optical system arrangement of the present invention with a simple driving mechanism which will be explained later.

Figure 5A:
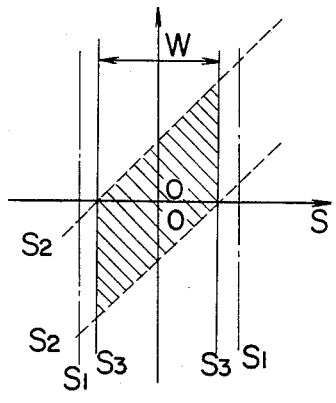
Figure 5B:
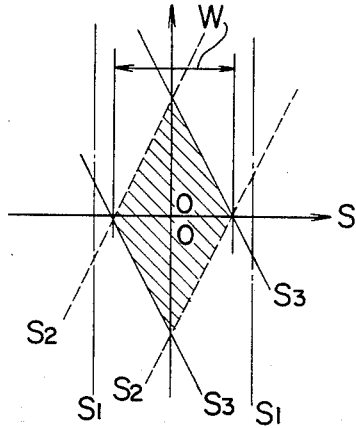

FIG. 5 shows the case where two monochrometers are arranged in a reverse or subtractive dispersion relation, namely, the directions of dispersion in the respective monochrometers are established in such a manner that the dispersions in the two monochrometers are subtracted from or reverse to each other. The reverse dispersion arrangement is suitable for the purpose of reducing the loss of light at slits. FIG. 5a is an example in which the linear dispersions of the first and second monochrometers are selected to be equal to each other and FIG. 5b is an example in which the linear dispersion of the first monochrometer is selected to be smaller than that of the second monochrometer. The sizes of the hatched areas in FIGS. 5a and 5b are the same. But, the example of FIG. 5a equally or uniformly takes out light rays within the slit width of each slit while the example of FIG. 5b primarily takes out light rays passed through each slit center portion. The example of FIG. 5b is most advantageous because of the provision of the smallest loss of light since in many cases the luminance on the plane of a slit is maximal in vicinity of the slit center. The example of FIG. 5b can be realized in the optical system arrangement of the present invention with a simple grating driving mechanism.

Figure 6:
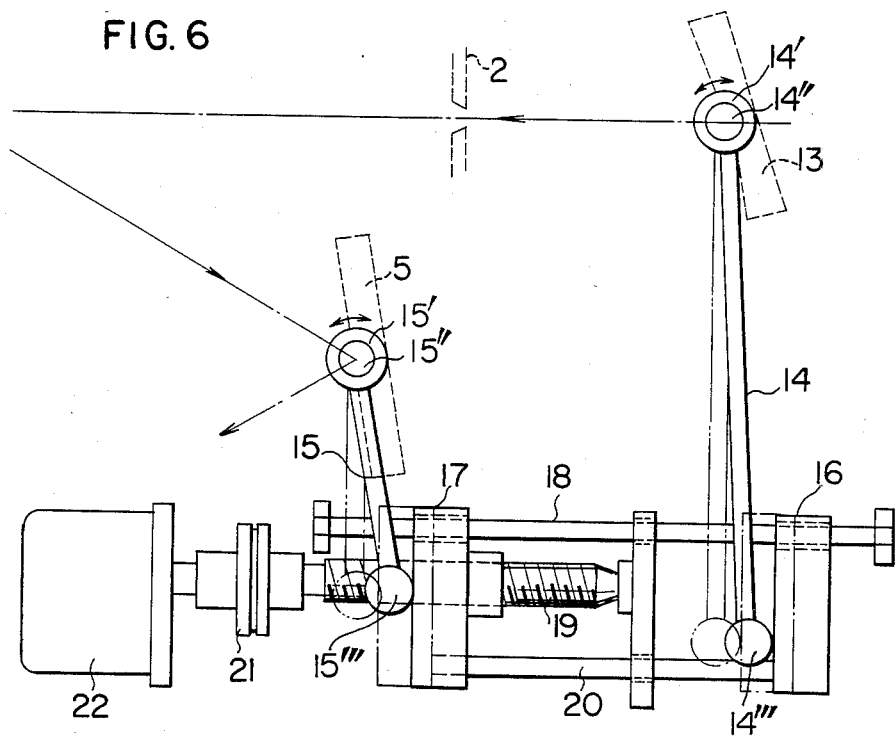
FIG. 6 is a schematic view of a preferred example of a grating driving mechanism which can be used for the double monochrometer embodying the present invention.

FIG. 6 schematically illustrates an example of a grating driving mechanism which can be used in the double monochrometer shown in FIG. 3. In FIG. 6, a reverse dispersion is achieved by rotating the concave and plane gratings 13 and 5 in the same direction. When the concave and plane gratings 13 and 5 have 600 and 1200 grooves per mm, respectively, the double monochrometer can be driven through a single feed screw 19 by making the length of a sine bar 14 for the concave grating 13 about two times as large as the length of a sine bar 15 for the plane grating 5 and arranging slider members 16 and 17 as shown in FIG. 6. Referring to FIG. 6, the feed screw 19 is rotated by a motor 22 which is connected through a coupling ring 21 thereto. As the screw 19 rotates, the slider or nut 17 engaged with the feed screw 19 moves along a fixed bar 18. At the same time, the slider 16 fixedly connected to the slider 17 through a bar 20 moves in the same direction as the slider 17. As a result, a wavelength scanning is effected so that the auxiliary monochrometer including the concave grating 13 and the main monochrometer including the plane grating 5 always transmit the same wavelength therethrough. The shown mechanism is attainable since the concave grating 13 can be disposed on the entrance axis of the main monochrometer. This mechanism can be equally used also when the concave grating 13 is disposed on the exit axis of the main monochrometer.

The engagement of the sine bars 14 and 15 with the gratings 13 and 5 and with the sliders 16 and 17 will be obvious to those skilled in the art. For example, a sleeve 14' (or 15') secured to one end of the sine bar 14 (15) and to the side face of the grating 13 (5) is rotatably mounted to a fixed shaft 14" (15"), and the other end of the sine bar 14 (15) is coupled to a steel ball 14''' (15''') which is rotatable in contact with the slider 16 (17). The sine bar 14 (15) is pulled toward the direction of the slider 16 (17).

There will now be explained how the lengths $l_1$ and $l_2$ of the sine bars 15 and 14 are determined when the grating constants of the plane and concave gratings 5 and 13 are freely selected. For a grating having a grating constant d, the following equation of dispersion is satisfied:

$$\frac{m\lambda}{d} = \sin\alpha + \sin\beta \qquad (1)$$

Here, $\alpha$ is an incident angle, $\beta$ a diffraction angle, m (=0, 1, 2, ...) the order of diffracted lights, and $\lambda$ the wavelength. The equation (1) is changed as follows:

$$\frac{m\lambda}{d} = 2\sin\frac{\alpha+\beta}{2}\cos\frac{\alpha-\beta}{2} \qquad (1')$$

By using $c = \beta - \alpha$, the following is obtained:

$$\frac{m\lambda}{d} = 2\sin\left(\alpha + \frac{c}{2}\right)\cos\frac{c}{2} \qquad (2)$$

$$\sin\left(\alpha + \frac{c}{2}\right) = \frac{m\lambda}{2d}/\cos\frac{c}{2}$$

$$\alpha = -\frac{c}{2} + \sin^{-1}\left(\frac{m\lambda}{2d}/\cos\frac{c}{2}\right)$$

By using a suffix "1" for each of parameters for the plane grating 5 and a suffix "2" for each of parameters for the concave grating 13, the equation (2) gives the following:

$$\alpha_1 = -\frac{c_1}{2} + \sin^{-1}\left(\frac{m\lambda}{2d_1}/\cos\frac{c_1}{2}\right) \qquad (3.1)$$

$$\alpha_2 = -\frac{c_2}{2} + \sin^{-1}\left(\frac{m\lambda}{2d_2}/\cos\frac{c_2}{2}\right) \qquad (3.2)$$

When $m = +1$ or $-1$, the angles $\theta_1$ and $\theta_2$ of rotation of the grating 5 and 13 from their zero-order positions are given by $$|\theta_1| = \sin^{-1}\left(\frac{\lambda}{2d_1}/\cos\frac{c_1}{2}\right) \qquad (4.1)$$

and $$|\theta_2| = \sin^{-1}\left(\frac{\lambda}{2d_2}/\cos\frac{c_2}{2}\right) \qquad (4.2)$$

The amounts of displacement of the sliders 17 and 16 are the same when $l_1 \sin|\theta_1| = l_2 \sin|\theta_2|$ is satisfied. Thus, the ratio $l_1/l_2$ is given by $$l_1/l_2 = \left(\frac{\lambda}{2d_2}/\cos\frac{c_2}{2}\right) / \left(\frac{\lambda}{2d_1}/\cos\frac{c_1}{2}\right) \qquad (5)$$

-continued $$= d_1 \cos \frac{c_1}{2} / d_2 \cos \frac{c_2}{2}$$

$$= d_1 \cos \frac{\beta_1 - \alpha_1}{2} / d_2 \cos \frac{\beta_2 - \alpha_2}{2}$$

An additive dispersion can be achieved by rotating the gratings 13 and 5 in opposite directions. A somewhat complicated driving mechanism is necessary in that case. For example, a single feed screw has two oppositely threaded portions which are to be associated with sliders coupled to sine bars.

Figure 7:
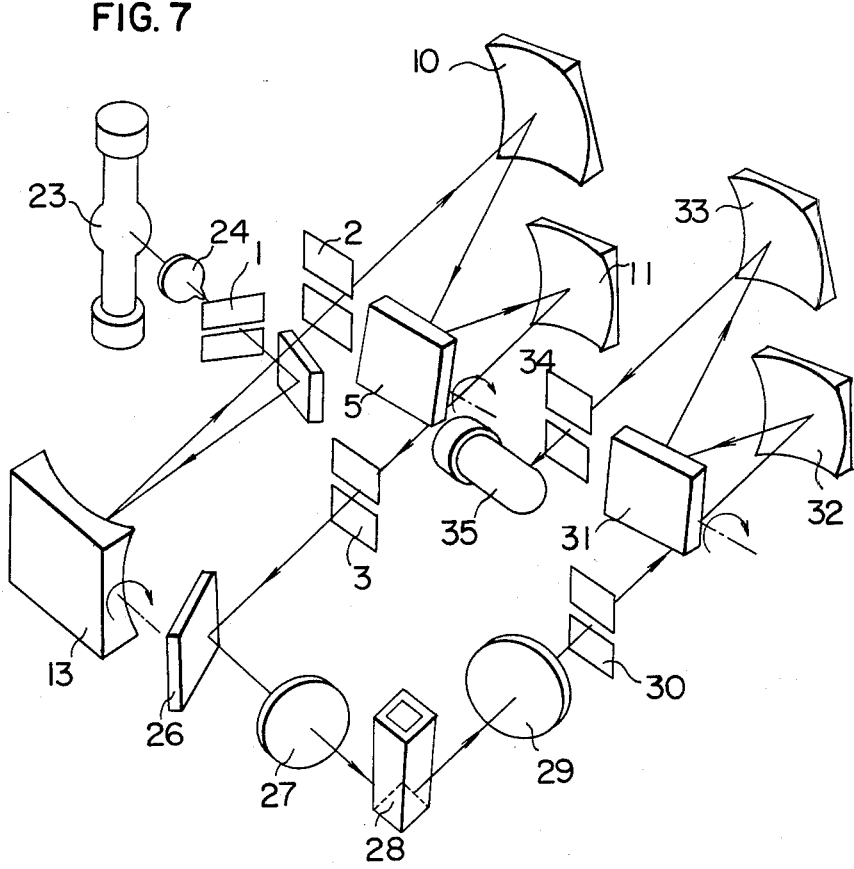
FIG. 7 shows the arrangement of an overall optical system when the double monochrometer embodying the present invention is used in a fluorescence spectrophotometer.

FIG. 7 shows an application in which the double monochrometer is conveniently used at the fluorescence exciting side of a fluorescence spectrophotometer. In FIG. 7, reference numeral 23 represents a Xenon lamp; 24, 27 and 29 lenses; 25 and 26 plane mirrors; 28 a sample cell; 30 an entrance slit on the fluorescence measuring side; 31 a plane grating; 32 and 33 spherical mirrors; 34 an exit slit on the fluorescence measuring side; and 35 a photomultiplier. The plane mirror 25 shown in the double monochrometer which has a mere function of changing the optical pass may be omitted. An approach of using a double monochrometer at the fluorescence exciting side of a fluorescence spectrophotometer in order to eliminate stray light from a monochrometic light to be used has been hitherto carried out. However, the use of the double monochrometer according to the present invention provides the following great merits.

A first merit is that though the conventional fluorescence spectrophotometers employing hitherto known double monochrometers were usually poor in performance including sensitivity due to a large loss of light in the double monochrometer, such a disadvantage is substantially eliminated in the fluorescence spectrophotometer using the double monochrometer according to the present invention.

A second merit is that the double monochrometer according to the present invention can be readily constructed with such an arrangement of two monochrometers as shown in FIG. 6, that is, with the directions of dispersion in the monochrometers being all vertical, since the optical system is simple because of the reduced number of optical elements and the grating driving mechanism is simple. The grating arrangement which is vertical in terms of the dispersion direction, means that all the apertures of the slits included extend in a horizontal direction and hence the sample cell 28 is illuminated with a horizontally elongated light flux. Such an illumination to the cell has an advantage that the sample cell need not contain a large amount of sample, which is particularly convenient in the field of applications such as biochemistry in which the attainable amount of a sample is less or restricted. A second advantage is that since the optical system disposed behind the horizontally illuminated sample cell has the horizontally elongated entrance slit 30, fluorescence produced from those portions of the sample illuminated two-dimensionally in horizontal directions can be fully or substantially taken in the horizontal optical system, which contributes to a further improvement on the sensitivity of the fluorescence spectrophotometer. In many cases of the conventional fluorescence spectrophotometers, fluorescence from a vertically illuminated sample cell is taken in a vertical optical system and hence an effective area is only a vertically crossing one-dimensioned portion.

We claim:

1. A double monochrometer comprising:
   a main monochrometer including an entrance slit, a plane grating and an exit slit; and
   an auxiliary monochrometer including a concave grating disposed on one of that portion of an entrance optical axis of said main monochrometer in front of the entrance slit thereof and that portion of an exit optical axis of said main monochrometer behind the exit slit thereof, the degree of dispersion of said concave grating being selected to be smaller than that of said plane grating.

2. A double monochrometer according to claim 1, wherein said main and auxiliary monochrometers have their directions of dispersion defined to provide a reverse dispersion relation with each other.

3. A double monochrometer according to claim 2, further comprising:
   first and second sine bars mounted at first ends thereof to said plane and concave gratings respectively and having their lengths related to the degrees of dispersion of said plane and concave gratings respectively; and
   a driving mechanism operatively associated with second ends of said first and second sine bars for simultaneously rotating said plane and concave gratings in the same direction.

4. A double monochrometer according to claim 3, wherein said driving mechanism includes a single rotatable feed screw, and first and second slider members coupled to said second ends of said first and second sine bars respectively, said first and second slider members being responsive to the rotation of said feed screw so that they simultaneously move in the axis direction of said feed screw.

5. A double monochrometer according to claim 4, wherein said first slider member includes a nut engaged with said feed screw to move in the axis direction of said feed screw in response to the rotation of said feed screw, said second slider member being connected to said first slider member opposite thereto.

6. A double monochrometer according to claim 3, wherein the lengths $l_1$ and $l_2$ of said first and second sine bars satisfy a relation of $$l_1/l_2 = d_1 \cos \frac{\beta_1 - \alpha_1}{2} / d_2 \cos \frac{\beta_2 - \alpha_2}{2}$$

where $d_1$ is the grating constant of said plane grating, $\alpha_1$ and $\beta_1$ the incident and diffraction angles on a surface of said plane grating, $d_2$ the grating constant of said concave grating, and $\alpha_2$ and $\beta_2$ the incident and diffraction angles on a surface of said concave grating.

7. A double monochrometer according to claim 1, wherein said concave grating is disposed in front of the entrance slit of said main monochrometer, and said auxiliary monochrometer includes its entrance slit, said concave grating, and its exit slit also serving as the entrance slit of said main monochrometer.

8. A double monochrometer according to claim 7, wherein said concave and plane gratings are disposed so that the directions of dispersion thereof are vertical while the entrance and exit slits of each of said main and auxiliary monochrometers are disposed so that apertures thereof horizontally extend.

9. A double monochrometer according to claim 1, wherein said concave grating is disposed behind the exit slit of said main monochrometer, and said auxiliary monochrometer includes its entrance also serving as the exit slit of said main monochrometer, said concave grating, and its exit slit.

10. A double monochrometer according to claim 9, wherein said concave and plane gratings are disposed so that the directions of dispersion thereof are vertical while the entrance and exit slits of each of said main and auxiliary monochrometers are disposed so that apertures thereof horizontally extend.

11. A double monochrometer comprising:
first, second and third slits;
a concave grating disposed between said first and second slits; and
a plane grating disposed between said second and third slits,
wherein one of said first and third slits, said second slit, and the other of said first and third slits serve as entrance, intermediate and exit slits of the double monochrometer respectively, the degree of dispersion of said concave grating being selected to be smaller than that of said plane grating, and said concave and plane gratings being arranged with their directions of dispersion being reverse to each other.

12. A double monochrometer according to claim 11, wherein a collimator mirror is disposed in one of an optical path between said second slit and said plane grating and an optical path between said plane grating and said third slit and a camera mirror is disposed in the other of the optical path between said second slit and said plane grating and the optical path between said plane grating and said third slit.

13. A double monochrometer according to claim 12, wherein said collimator and camera mirrors are formed by a single integral mirror.

14. A double monochrometer according claim 11, wherein the directions of dispersion by said concave and plane gratings are vertical while said first, second and third slits are disposed with their apertures extending horizontally.

15. A double monochrometer according to claim 11, further comprising first and second sine bars mounted at first ends thereof to said plane and concave gratings respectively and having their lengths related to the degrees of dispersion of said plane and concave gratings, respectively, and a drive means operatively associated with second ends of said first and second sine bars for simultaneously rotating said plane and concave gratings in the same direction.

* * * * *